July 31, 1923.
W. A. SOMERS
HANDLE
Filed Sept. 10, 1921
1,463,341
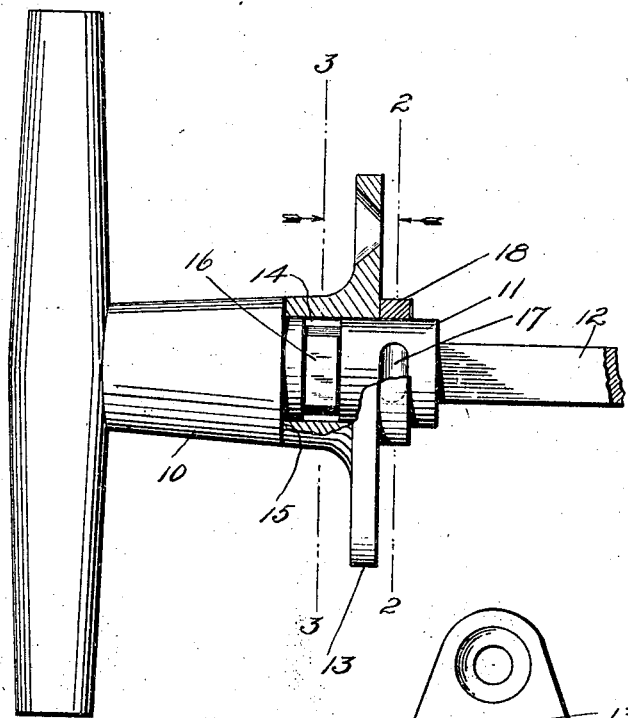
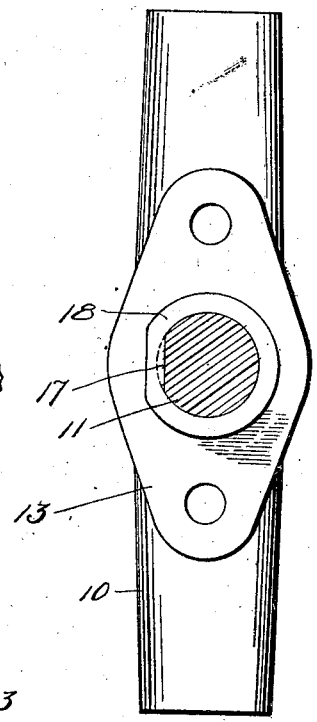
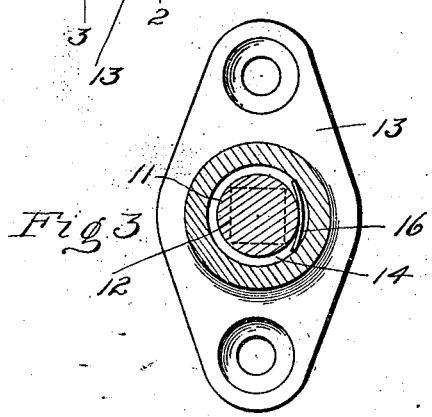
Inventor
William A. Somers
By George E. Hall
Att'y Patented July 31, 1923.

1,463,341

UNITED STATES PATENT OFFICE.

WILLIAM A. SOMERS, OF HAMDEN, CONNECTICUT, ASSIGNOR TO THE MT. CARMEL MANUFACTURING COMPANY, OF MOUNT CARMEL, CONNECTICUT, A CORPORATION OF CONNECTICUT.

HANDLE.

Application filed September 10, 1921. Serial No. 499,703.

*To all whom it may concern:*

Be it known that I, WILLIAM A. SOMERS, a citizen of the United States, residing at Mt. Carmel, in the town of Hamden, county of New Haven, and State of Connecticut, have invented certain new and useful Improvements in Handles, of which the following is a specification, reference being had therein to the accompanying drawings.

This invention relates to new and useful improvements in handles, relating particularly to handles for motor vehicle doors, although, of course, not limited to such use.

The principal object of the invention is to so design and construct the handle and its several parts that exact machining is not required and any looseness or wear will be taken up by simple means that will operate effectively and will not only prevent rattling but apply a smooth, constant pressure that produces a most desirable rotatable connection.

Among other aims and objects of the invention may be recited the provision of a device of the character mentioned with a view to compactness and in which the number of parts are few, the construction simple, the cost of production small, and efficiency and operation high.

The improvements in the details and arrangement of parts will be apparent from an inspection of the accompanying drawings, in connection with the description hereinafter contained, and wherein an embodiment of the invention is disclosed for the purpose of imparting a full understanding of the same.

Having more particular reference to the drawings and in connection with which like reference characters refer to corresponding parts in the several figures;

Figure 1 is an elevation, partly in section, of my improved device;

Figure 2 is an end view thereof, the part in section being taken generally upon line 2—2 of Figure 1; and Figure 3 is another end elevation with the parts in section, being taken generally upon line 3—3 of Figure 1.

In the drawings, 10 designates the grip member, 11 the shank connected therewith, 12 the spindle, and 13 the collar plate or escutcheon. All of these parts, with the exception of the modification of the shank hereinafter described, are of a well known form and construction.

A groove 14 is provided in the shank adjacent to the shoulder 15 of the grip member 10, and inserted therein is a spring 16, which is preferably, but not necessarily, flat before assembled but bowed slightly when placed in the groove and after the collar plate 13 is in position the opposite ends thereof spring outwardly and bite against the bore of the collar, thus holding the spring against movement within the collar and only the intermediate portion has contact with the shank within the groove. The shank is provided with a depression 17 just outside of the inner face of the collar plate 13, and a collar 18 is placed thereon after the escutcheon and spring have been assembled to which pressure is applied upon one side and a portion thereof projected into said depression, thus holding the collar against relative endwise movement upon the shank and forming an abutment for the inner face of the collar plate 13. When the parts are so assembled the spring 16 takes up any looseness or lost motion that there may be between the spindle and bore of the collar plate and holds the latter with a slight internal and lateral pressure that prevents rattling and at the same time applies an easy pressure that is invariable during the rotation of the handle.

The means shown for connecting the collar 18 or the shank 11 is only one of the many means by which this result is accomplished.

Within the scope of the appended claims many changes and alterations may be made within the details of my invention, therefore I would have it understood that I do not limit myself to the exact construction herein shown and described.

Having described my invention, what I claim as new and desire to secure by Letters Patent, is:—

1. A handle having a shank portion; an escutcheon rotatably mounted thereon; and means occupying a position that is at a right angle to the axis of said shank portion for applying internally, an outward lateral pressure to said escutcheon relatively to said handle.

2. A handle having a shank portion; an escutcheon rotatably mounted thereon; and means occupying a position that is at a right angle to the axis of said shank portion for applying a constant internal, lateral, and outward pressure to said escutcheon relatively to said handle.

3. A handle having a shank portion, with a groove therein; an escutcheon mounted on said shank; means for holding the same against endwise movement; and means within said groove occupying a position that is at a right angle to the axis of said shank portion applying a lateral pressure to the inside of the bore of said escutcheon relatively to said shank.

4. A handle having a shank portion; an escutcheon rotatably mounted thereon; and means occupying a position that is at a right angle to the axis of said shank portion for applying lateral outward pressure to the inside of the bore of said escutcheon relatively to said handle and upon one side thereof.

5. A handle having a shank portion, with a groove therein; an escutcheon mounted on said shank covering said groove; and a pressure element within said groove occupying a position that is at a right angle to the axis of said shank portion and applying an outward lateral pressure to said escutcheon.

6. A handle having a shank portion, with a groove therein; an escutcheon mounted on said shank covering said groove; and a pressure element within said groove occupying a position that is at a right angle to the axis of said shank portion and applying an outward lateral pressure to said escutcheon at one side of said shank.

7. A handle having a shank portion, with a groove therein; an escutcheon mounted on said shank and covering said groove; and a pressure element within said groove occupying a position that is at a right angle to the axis of said shank portion and applying lateral pressure to said escutcheon and held against movement relatively to one of the parts with which it contacts.

8. A handle; an escutcheon rotatably connected therewith; and a pressure element within said escutcheon occupying a position that is at a right angle to the axis of said handle and applying lateral pressure thereto relatively to said handle.

9. A handle; an escutcheon rotatably connected therewith; and a pressure element within said escutcheon occupying a position at a right angle to the axis of said handle applying lateral pressure thereto, held against endwise movement upon said handle and against rotary movement in relation to one of the parts with which it contacts.

10. A handle; an escutcheon rotatably connected therewith; and a pressure element within said escutcheon applying lateral pressure thereto relatively to said handle and having engagement with the bore of the escutcheon at substantially a right angle to the axis of said handle whereby the same is held against relative movement.

11. A handle; an escutcheon rotatably connected therewith; and a pressure element within said escutcheon, applying lateral pressure thereto relatively to said handle, having contact at its ends with the bore of said escutcheon and contacting between its ends with a portion of said handle.

12. A handle having a groove therein; an escutcheon rotatably mounted thereon and covering said groove; and a spring of substantially the same width as said groove occupying a position at substantially a right angle to the axis of the handle and contacting at its ends with the bore of said escutcheon and midway between its ends with the bottom of said groove, thereby applying a lateral pressure to said escutcheon in relation to said handle and holding said escutcheon against endwise movement in relation to said handle.

13. A handle having a shank portion with a shoulder thereon; an escutcheon rotatably mounted thereon with its inner face abutting against said shoulder; and means inside of the bore of said escutcheon occupying a position that is at a right angle to the axis of said shank portion for applying constant lateral and outward pressure to said escutcheon relatively to said handle.

14. A handle having a shank portion with a shoulder thereon; an escutcheon rotatably mounted thereon with its inner face abutting against said shoulder; means for applying lateral pressure to said escutcheon relatively to said handle; and an escutcheon upon said shank forming a shoulder or abutment for the inner face of said escutcheon and held against relative movement upon said shank by projecting a portion thereof into a depression in said shank.

15. A handle; an escutcheon rotatably connected therewith; and a pressure element within said escutcheon applying lateral pressure thereto relatively to said handle, said pressure element comprising a flat spring before assembly that is bowed by the ends thereof engaging the bore of said escutcheon and when assembled occupying a position at substantially a right angle to the axis of said handle with said bowed portion contacting with a part of said handle.

In testimony whereof, I have hereunto affixed my signature.

WILLIAM A. SOMERS.